United States Patent
Kim et al.

(10) Patent No.: US 10,497,976 B2
(45) Date of Patent: Dec. 3, 2019

(54) LITHIUM AIR BATTERY INCLUDING QUINONE-BASED LIQUID CATALYST INDUCING DISCHARGE IN SOLUTION

(71) Applicants: Hyundai Motor Company, Seoul (KR); Kia Motors Corporation, Seoul (KR); Seoul National University R&DB Foundation, Seoul (KR)

(72) Inventors: Won Keun Kim, Suwon-si (KR); Jin Soo Kim, Suwon-si (KR); Kyoung Han Ryu, Yongin-si (KR); Ho Taek Lee, Seoul (KR); Byung Ju Lee, Seoul (KR); Ki Suk Kang, Seoul (KR); Young Min Ko, Seoul (KR)

(73) Assignees: Hyundai Motor Company, Seoul (KR); Kia Motors Corporation, Seoul (KR); Seoul National University R&DB Foundation, Seoul (KR)

(*) Notice: Subject to any disclaimer, the term of this patent is extended or adjusted under 35 U.S.C. 154(b) by 44 days.

(21) Appl. No.: 15/845,908

(22) Filed: Dec. 18, 2017

(65) Prior Publication Data
US 2018/0183102 A1    Jun. 28, 2018

(30) Foreign Application Priority Data
Dec. 23, 2016 (KR) .................. 10-2016-0177581

(51) Int. Cl.
| | | |
|---|---|---|
| *H01M 10/0567* | (2010.01) | |
| *H01M 10/0568* | (2010.01) | |
| *H01M 10/0569* | (2010.01) | |
| *H01M 12/02* | (2006.01) | |
| *H01M 12/08* | (2006.01) | |

(52) U.S. Cl.
CPC ... *H01M 10/0567* (2013.01); *H01M 10/0568* (2013.01); *H01M 10/0569* (2013.01); *H01M 12/02* (2013.01); *H01M 12/08* (2013.01); *H01M 2220/20* (2013.01); *H01M 2300/0025* (2013.01); *H01M 2300/0028* (2013.01); *H01M 2300/0091* (2013.01); *Y02E 60/128* (2013.01)

(58) Field of Classification Search
CPC ......... H01M 10/0567; H01M 10/0568; H01M 10/0569; H01M 12/02; H01M 2220/20; H01M 2300/0028; Y02E 60/128
See application file for complete search history.

(56) References Cited

U.S. PATENT DOCUMENTS

| | | | | |
|---|---|---|---|---|
| 2012/0171563 A1* | 7/2012 | Kang | ............... | H01M 10/052 429/199 |
| 2013/0137002 A1* | 5/2013 | Lee | ................. | H01M 4/382 429/405 |

FOREIGN PATENT DOCUMENTS

| | | |
|---|---|---|
| KR | 10-2013-0123621 A | 11/2013 |
| KR | 10-2016-0044699 A | 4/2016 |

* cited by examiner

*Primary Examiner* — Brittany L Raymond
(74) *Attorney, Agent, or Firm* — Morgan, Lewis & Bockius LLP (57) ABSTRACT

A lithium air battery may include an electrolyte with a donor number of 10 to 40; and a quinone-based liquid catalyst which added to the electrolyte to induce a discharge in the solution.

5 Claims, 5 Drawing Sheets

LITHIUM AIR BATTERY INCLUDING QUINONE-BASED LIQUID CATALYST INDUCING DISCHARGE IN SOLUTION

CROSS-REFERENCE TO RELATED APPLICATION

The present application claims priority to Korean Patent Application No. 10-2016-0177581 filed on Dec. 23, 2016, the entire contents of which is incorporated herein for all purposes by this reference.

BACKGROUND OF THE INVENTION

Field of the Invention

The present invention relates to a technology capable of significantly increasing a discharge capacity of a lithium air battery by adding a quinone-based liquid catalyst to an electrolyte with a low donor number to induce a discharge in the solution.

Description of Related Art

Currently, the field of art has been confronted with various problems such as depletion of fossil fuels, environmental pollution, and global warming, accompanied by a rapid growth. As a countermeasure against the problems, new renewable energy is being developed, but no remarkable success has been achieved so far. Accordingly, interests in the energy storage technology, particularly the battery field, have rapidly increased.

As a result, significant progress has been made in the lithium ion battery, but the lithium ion battery developed to date has been evaluated to be insufficient to replace fossil fuels due to the low energy density.

Thus, recently, the development of the metal air battery, particularly, lithium air battery has been actively made primarily in the developed countries such as United States of America and Japan.

Since the lithium air battery uses oxygen capable of being supplied infinitely from the air as an active material, it is possible to obtain a very high discharge capacity by theory. Therefore, in order to maximize an advantage which is a high discharge capacity, it is important to understand factors which affect a discharge reaction of a lithium air battery.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an opportunity to enhance understanding of a mechanism of a discharge reaction of a lithium air battery and factors which affect the mechanism.

Various aspects of the present invention are directed to providing a new combination of an electrolyte and a liquid catalyst, which is capable of significantly improving a discharge capacity by inducing a discharge in the solution in a lithium air battery.

The object of the present invention is not limited to the aforementioned object. The object of the present invention will be more apparent from the following description and will be realized by means described in the claims and by combinations thereof.

Various aspects of the present invention are directed to providing a lithium air battery including an electrolyte with a donor number of 10 to 40 (e.g., 10 to 40, 10 to 30, 10 to 20, 15 to 40, 15 to 30, 20 to 40, 30 to 40, and the like) and a quinone-based liquid catalyst which is added to the electrolyte to induce a discharge in the solution.

In an exemplary embodiment of the present invention, the electrolyte may be selected from the group consisting of selected from the group consisting of dimethoxyethane (DME), diethylene glycol dimethyl ether (DEGDME), triethylene glycol dimethyl ether (TEGDME), tetraethylene glycol dimethyl ether (TEGDME), dimethylsulfoxide, dimethylacetamide, acetonitrile and a mixture thereof.

In another exemplary embodiment, the quinone-based liquid catalyst may be phylloquinone or menaquinone.

In yet another exemplary embodiment, the quinone-based liquid catalyst may be a compound represented by the following Formula 2.

[Formula 2]

wherein n may be 4, 7, or 9.

In yet another exemplary embodiment, the quinone-based liquid catalyst may be included at a concentration of about 10 mM to about 50 mM (e.g., about 10 mM, about mM, about 20 mM, about 25 mM, about 30 mM, about 35 mM, about 40 mM, about 45 mM or about 50 mM) in the electrolyte.

Since the present invention includes the foregoing configuration, the following effects may be obtained according to the configuration.

According to an exemplary embodiment of the present invention, even though an electrolyte with a low donor number is used, a discharge in the solution is induced instead of a discharge on the surface, and as a result, the discharge capacity of a lithium air battery may be improved by several ten times or more.

According to an exemplary embodiment of the present invention, it is possible to suppress irreversible by-products from being produced during the discharge of a lithium air battery because an electrolyte with a low donor number is used. The effects of the present invention are not limited to the aforementioned effects. The effects of the present invention are to be understood to include all the effects capable of being inferred from the following explanation.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings includes reference to the following elements as further discussed below:

10: Li-catalyst
20: $LiO_2$-catalyst
30: discharge product

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through Examples. The Examples of the present invention may be modified in various forms as long as the gist of the invention is not changed. However, the right scope of the present invention is not limited to the following Examples.

If it is judged that publicly known configurations and functions may obscure the gist of the present invention, the description on the publicly known configurations and functions will be omitted. The term "including" in the present specification means further including other constituent elements unless otherwise specifically described.

A lithium air battery is a battery system which uses lithium as an anode and uses oxygen in the air as an active material in a cathode (air electrode). An oxidation and reduction reaction of lithium occurs in the anode, and a reduction and oxidation reaction of oxygen introduced from the outside occurs in the cathode.

When a lithium air battery is discharged, reactions occurring in the anode and the cathode are as follows.

(Anode): $Li \rightarrow Li^+ + e^-$ (Cathode): $2Li^+ + O_2 + 2e^- \rightarrow Li_2O_2$ The lithium metal in the anode is oxidized to produce lithium ions and electrons. The lithium ions and the electrons move to the cathode through an electrolyte and through an external conducting wire or a current collector, respectively. Since the cathode is porous, the external air may be introduced into the cathode. Oxygen included in the external air is reduced by the electrons in the cathode, and a lithium peroxide ($Li_2O_2$) being a discharge product is formed.

A lithium air battery of the present invention is an organic lithium air battery which uses an organic electrolyte as an electrolyte. Since the organic lithium air battery uses an organic electrolyte which is not reactive with the anode, there is an advantage in that the structure is simple, and the discharge capacity and the energy density are high.

In general, an electrolyte with a high donor number is used as the organic electrolyte. This is because an organic electrolyte with a high donor number forms a discharge product through a discharge in a solution, and as a result, a lithium air battery having a high discharge capacity may be obtained as compared to when an organic electrolyte with a low donor number is used. Hereinafter, this will be specifically described.

When a lithium air battery is discharged, a lithium peroxide ($Li_2O_2$) being a discharge product is produced, and the lithium peroxide may be produced via two routes.

As a first route, the lithium peroxide may be produced in the form of a thin film on the surface of the cathode via a discharge on the surface. As a second route, the lithium peroxide may be produced while being grown to relatively large particles such as toroid in an electrolyte, instead of on the surface of the cathode, via a discharge in the solution. When the lithium peroxide is produced via the latter discharge in the solution, a larger discharge capacity may be obtained. This is because when the lithium peroxide is produced in the form of a thin film on the surface of the cathode as in the former case, the lithium peroxide clogs pores in the cathode, so that an area in which oxygen, electrons, and lithium ions may be reacted is reduced.

One of the most important factors affecting the route via which the lithium peroxide is produced is just a donor number of an organic electrolyte. It is known that when an ether-based electrolyte with a low donor number is used, the former discharge on the surface is induced, so that a low discharge capacity is exhibited, and when an electrolyte with a high donor number, such as dimethyl sulfoxide (DMSO) and dimethylacetamide (DMA), is used, the latter discharge in the solution is induced, so that a high discharge capacity is exhibited.

The reason why the donor number of the electrolyte affects the discharge reaction as described above is that the electrolyte directly affects the degree of stability of a lithium superoxide ($LiO_2$) being an intermediate of a discharge product in the electrolyte.

When the above-described lithium air battery is discharged, reactions occurring in the cathode may be interpreted as follows.

$$Li^+ + O_2 + e^- \rightarrow LiO_2 \quad (1)$$

$$LiO_2 + Li^+ + e^- \rightarrow Li_2O_2 \quad (2)$$

$$2LiO_2 \rightarrow Li_2O_2 + O_2 \text{(disproportionation)} \quad (3)$$

When the donor number is low, the intermediate ($LiO_2$) is not stable in an electrolyte, and as a result, the intermediate receives electrons from an electrode and thus is reduced in a state where the intermediate is adsorbed on a surface of a cathode, and accordingly, a discharge product is formed in the form of a thin film on the surface of the cathode.

In contrast, when the donor number is high, the intermediate may be relatively stably present in an electrolyte, and as a result, the intermediate is reduced via disproportionation in the electrolyte (solution), and accordingly, a discharge product is formed in the form of particles in the electrolyte.

The presence position of the intermediate is determined depending on the degree of stability thereof in the electrolyte, and accordingly, the production mechanism and production position of $Li_2O_2$ are changed.

For the aforementioned reasons, an organic electrolyte with a high donor number was usually used in order to improve a discharge capacity of a lithium air battery in the related art.

However, since an organic electrolyte with a high donor number has high polarity properties, the organic electrolyte is vulnerable to oxygen radicals produced during the discharge and thus is decomposed by the oxygen radicals during the discharge, thereby forming an irreversible by-product such as $Li_2CO_3$. Thus, as a lithium air battery is charged and discharged, there is a problem in that a by-product which has not been decomposed is gradually built up in a cell. Accordingly, in effect, there is a limitation in that the degree of improving the discharge capacity according to the use of an organic electrolyte with a high donor number is not so high.

Thus, the present invention is characterized by greatly improving the discharge capacity by using an electrolyte with a low donor number, which is relatively less vulnerable to oxygen radicals and thus produces fewer irreversible by-products, and by adding a quinone-based liquid catalyst to the electrolyte to induce a discharge in the solution.

Specifically, the lithium air battery according to an exemplary embodiment of the present invention includes an electrolyte with a low donor number and a quinone-based liquid catalyst which is added to the electrolyte to induce a discharge in the solution.

The electrolyte may be an organic electrolyte with a donor number of 40 or less (e.g., about 40, 39, 38, 37, 36, 35, 34, 33, 32, 31, 30, 29, 28, 27, 26, 25, 24, 23, 22, 21, 29 or less), specifically 25 or less (e.g., about 25, 24, 23, 22, 21, 20, 19, 18, 17, 16, 15, 14, 13, 12, 11, or 10), and more specifically 10 to 20 (e.g., 10, 11, 12, 13, 14, 15, 16, 17, 18, 19, or 20).

Specifically, the electrolyte may be selected from the group consisting of selected from the group consisting of dimethoxyethane (DME), diethylene glycol dimethyl ether (DEGDME), triethylene glycol dimethyl ether (TEGDME), tetraethylene glycol dimethyl ether (TEGDME), dimethylsulfoxide, dimethylacetamide, acetonitrile and a mixture thereof.

The electrolyte may further include a lithium salt, and the lithium salt may be any one or more of $LiPF_6$, $LiBF_4$, $LiSbF_6$, $LiAsF_6$, $LiClO_4$, $LiCF_3SO_3$, $Li(CF_3SO_2)2N$, $LiC_4F_9SO_3$, $LiSbF_6$, $LiAlO_4$, $LiAlCl_4$, $LiCl$, $LiI$, and $LiN(C_xF_{2x+1}SO_2)(C_yF_{2y+1}SO_2)$ (wherein x and y are natural numbers), and may be preferably $LiN(C_xF_{2x+1}SO_2)(C_yF_{2y+1}SO_2)$ (LiTFSI).

The electrolyte has a polarity which is not high due to the low donor number and thus is relatively more stable to oxygen radicals than an electrolyte with a high donor number, and as a result, the degree of producing an irreversible by-product is low. However, when the electrolyte is used alone due to the low donor number, the electrolyte induces the discharge on the surface as described above.

Thus, the present invention induces a discharge in the solution by adding a quinone-based liquid catalyst to the electrolyte, and the quinone-based liquid catalyst may be phylloquinone represented by the following Formula 1 or menaquinone represented by the following Formula 2. In particular, the menaquinone may be specifically menaquinone-4 (when n=4), menaquinone-7 (when n=7), or menaquinone-9 (when n=9).

[Formula 1]

[Formula 2]

wherein n=4, 7, or 9.

The quinone-based liquid catalyst may be added at a concentration of about 10 mM to about 100 mM (e.g., about 10 mM, about 15 mM, about 20 mM, about 25 mM, about 30 mM, about 35 mM, about 40 mM, about 45 mM, about 50 mM, about 55 mM, about 60 mM, about 65 mM, about 70 mM, about 75 mM, about 80 mM, about 85 mM, about 90 mM, about 95 mM, or 100 mM), specifically about 10 mM to about 50 mM (e.g., about 10 mM, about 15 mM, about 20 mM, about 25 mM, about 30 mM, about 35 mM, about 40 mM, about 45 mM, about 50 mM), and more specifically about 10 mM to the electrolyte. When the amount of quinone-based liquid catalyst is extremely large, the viscosity of the electrolyte (solution) is increased, and as a result, there may be a problem in that the action as a reversible catalyst deteriorates due to the deterioration in diffusion of the quinone-based liquid catalyst. In contrast, when the amount thereof is extremely small, it may be difficult to induce a discharge in the solution.

Hereinafter, referring to FIG. 1, when an electrolyte with a low donor number and the quinone-based liquid catalyst are used in combination in an exemplary embodiment of the present invention, the mechanism in which a discharge in the solution proceeds will be specifically described.

When a lithium air battery begins to be discharged, first, the quinone-based liquid catalyst (hereinafter, referred to as the catalyst) is reacted with a lithium ion ($Li^+$) to form an Li-catalyst 10 while being reduced by being supplied with electrons from the surface of the cathode. The Li-catalyst 10 is reacted with oxygen ($O_2$) supplied from the outside in the electrolyte to form a $LiO_2$-catalyst 20 as an intermediate of a lithium peroxide ($Li_2O_2$). In this case, since the site of producing the $LiO_2$-catalyst 20 is in the electrolyte instead of on the surface of the cathode, the above-described discharge in the solution is induced. That is, since the $LiO_2$-catalyst 20 is present in the electrolyte instead of on the surface of the cathode, the $LiO_2$-catalyst 20 is reacted with lithium ions ($Li^+$) in the electrolyte, and accordingly, a lithium peroxide ($Li_2O_2$, 30) being a discharge product is produced in the electrolyte instead of on the surface of the cathode.

Figure 1:
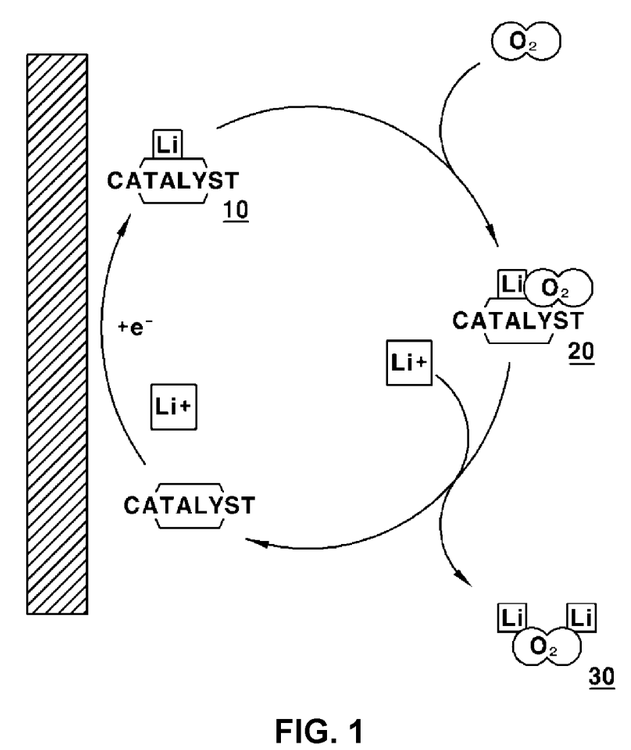
FIG. 1 is a reference view for explaining a mechanism of a discharge in a solution of a lithium air battery according to an exemplary embodiment of the present invention.

Therefore, according to an exemplary embodiment of the present invention, since the lithium peroxide 30 is produced while being grown to relatively large particles such as toroid in the electrolyte as illustrated in FIG. 1 without clogging the pores by being formed in the form of a thin film on the surface of the cathode, it is possible to implement a lithium air battery having a discharge capacity which is several ten times or more than that of a lithium air battery in which a discharge on the surface is induced.

Hereinafter, the present invention will be described in more detail through Examples. However, the Examples are provided for exemplifying the present invention, and the scope of the present invention is not limited thereby.

EXAMPLES

The following examples illustrate the invention and are not intended to limit the same.

Example 1

A lithium air battery cell with an anode being a lithium metal foil (Hohsen, Japan) having a thickness of 300 μm and a diameter of ½ inch, a separation membrane being a glass fiber filter (GF/F, Whatman), and a cathode (air electrode) being a gas diffusion layer (GDL, H2315, Quintech) made of a carbon fiber was manufactured. The cell was completed by injecting an electrolyte into the cell. As the electrolyte, an electrolyte in which a lithium salt (LiTFSI) was dissolved at a concentration of 1 M in dimethoxyethane (DME) with a donor number of 20 was used, and menaquinone-4 (a compound in which n=4 in Formula 2) as a quinone-based liquid catalyst was added at a concentration of 10 mM to the electrolyte.

Example 2

A lithium air battery cell was completed in the same configuration and manner as in Example 1, except that as the electrolyte, tetraethylene glycol dimethyl ether (TEGDME) with a donor number of 16.6 was used instead of dimethoxyethane (DME).

Comparative Example

A lithium air battery cell was completed in the same configuration and manner as in Example 1, except that as the electrolyte, tetraethylene glycol dimethyl ether (TEGDME) was used, and a quinone-based liquid catalyst was not added to the electrolyte.

Test Examples

A discharge was carried out while applying a current of 0.2 $mA/cm^2$ to the lithium air battery cells in Examples 1 and 2 and the Comparative Example.

After the discharge was completed, a scanning electron microscope (SEM) analysis was carried out on the cells. The results are shown in FIG. 2. Specifically, FIG. 2A is a result of the Comparative Example, FIG. 2B is a result of Example 2, and FIG. 2C is a result of Example 1.

Figure 2A:
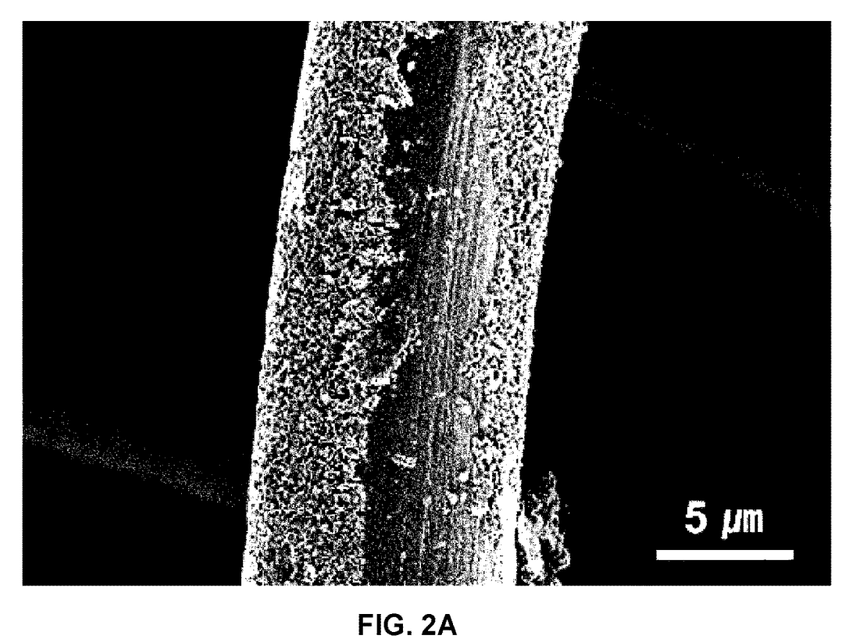
FIG. 2A is a scanning electron microscope (SEM) analysis result of a lithium air battery of a Comparative Example of the present invention.
Figure 2B:
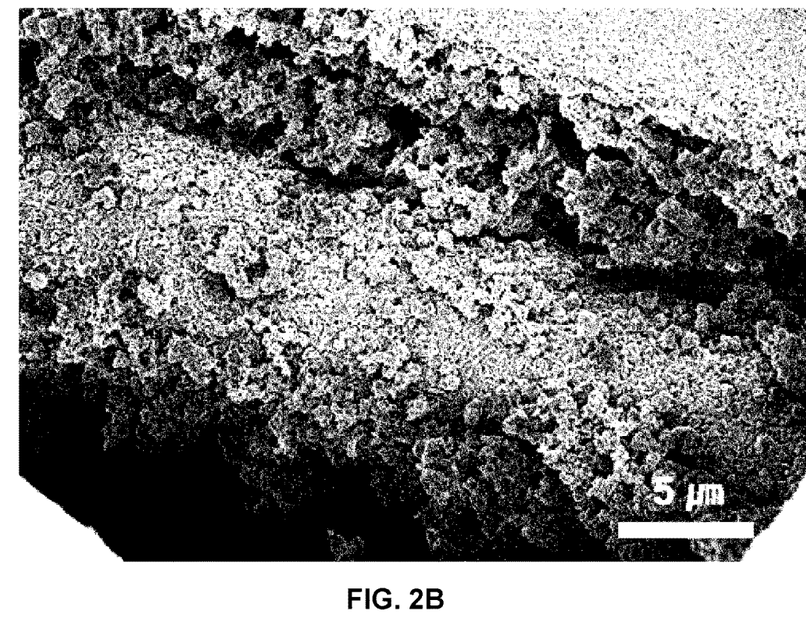
FIG. 2B is a scanning electron microscope (SEM) analysis result of a lithium air battery of Example 2 of the present invention.
Figure 2C:
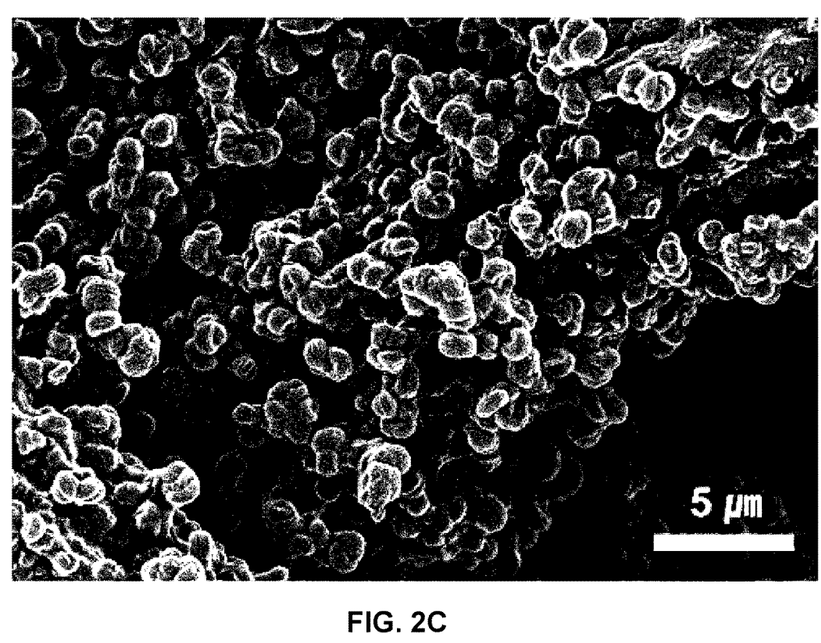
FIG. 2C is a scanning electron microscope (SEM) analysis result of a lithium air battery of Example 1 of the present invention.

Referring to FIG. 2A, it can be seen that when a quinone-based liquid catalyst was not added, a discharge on the surface was induced, and as a result, a discharge product was produced only on the surface of the cathode. In contrast, referring to FIGS. 2B and 2C, it can be confirmed that when the quinone-based liquid catalyst was present, a discharge in the solution was induced, and as a result, the discharge product fell off from the surface of the cathode and was formed in the form of toroid in the electrolyte.

Figure 3:
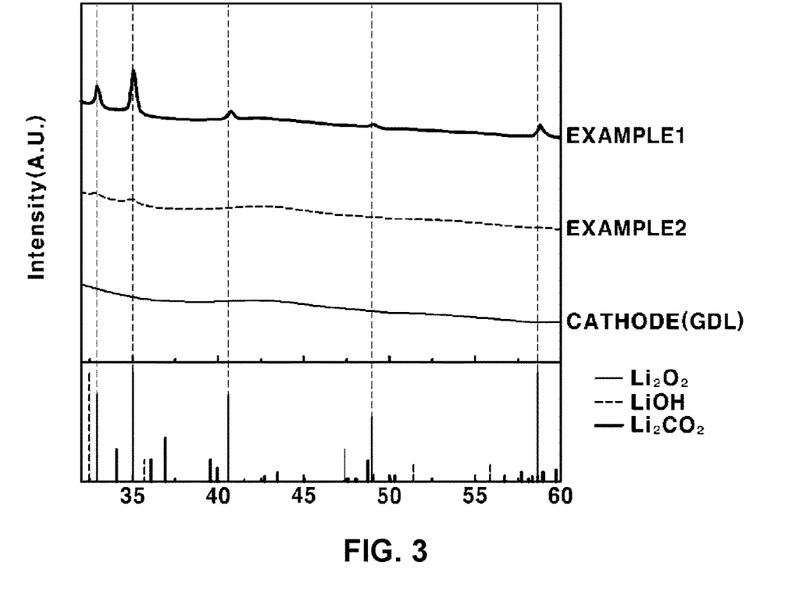
FIG. 3 is X-ray diffraction (XRD) analysis results of the lithium air batteries of Example 1 and Example 2 of the present invention.

An X-ray diffraction (XRD) analysis was carried out on the discharge products which were formed after the discharge was completed for the lithium air batteries in Example 1 and Example 2. The results are shown in FIG. 3. Referring to the results, it can be confirmed that the discharge product was mainly a lithium peroxide ($Li_2O_2$), and a product such as LiOH and $Li_2CO_3$ was not produced.

Figure 4:
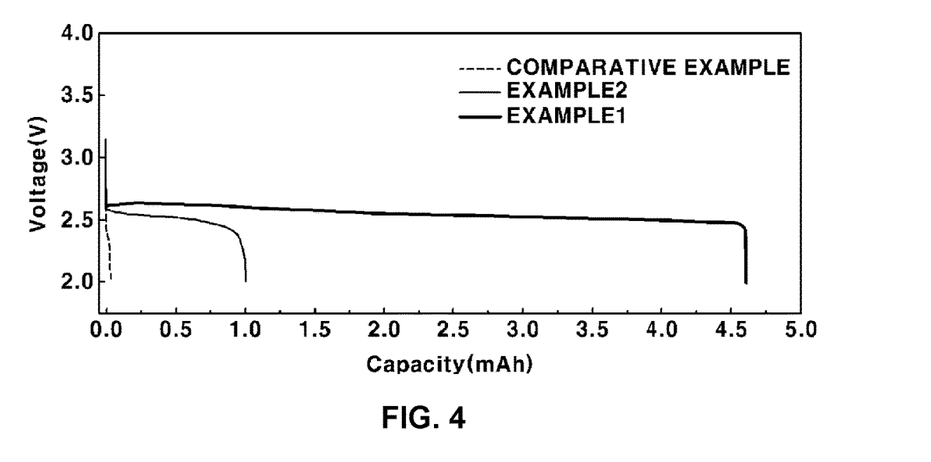
FIG. 4 is results of measuring the discharge capacities of the lithium air batteries of Example 1, Example 2, and the Comparative Example of the present invention.

When the lithium air batteries in Example 1, Example 2, and the Comparative Example were discharged, the discharge capacities were measured. The results are shown in FIG. 4. Referring to the results, it can be seen that in the case of the Comparative Example, the discharge capacity was extremely low because the discharge on the surface was induced so that a discharge product was formed on the surface of the cathode. In contrast, it can be confirmed that in the case of Example 1 and Example 2, particularly, Example 1, the discharge in the solution was induced, and as a result, a discharge capacity improved several ten times or more than that the Comparative Example was exhibited.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lithium air battery comprising:
an electrolyte with a donor number of 10 to 40; and
a quinone-based liquid catalyst which is added to the electrolyte to induce a discharge in the solution,
wherein the quinone-based liquid catalyst is menaquinone and is represented by the following Formula 2:

wherein n is 4, 7, or 9.

2. The lithium air battery of claim 1, wherein the electrolyte is selected from the group consisting of dimethoxyethane (DME), diethylene glycol dimethyl ether (DEGDME), triethylene glycol dimethyl ether (TEGDME), tetraethylene glycol dimethyl ether (TEGDME), dimethylsulfoxide, dimethylacetamide, acetonitrile and a mixture thereof.

3. The lithium air battery of claim 1, wherein the electrolyte comprises one or more lithium salts selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, LiI, and $LiN(C_xF_{2x+1}SO_2)(C_yF_{2y+1}SO_2)$, and x and y are natural numbers.

4. The lithium air battery of claim 1, wherein the quinone-based liquid catalyst is comprised at a concentration of about 10 mM to about 50 mM in the electrolyte.

5. The lithium air battery of claim 1, comprising:
an anode including a lithium metal;
a cathode; and
a separation membrane disposed between the anode and the cathode,
wherein the electrolyte and the quinone-based liquid catalyst are comprised in the cathode.

* * * * *